US005927473A

United States Patent [19]

Draghetti

[11] Patent Number: 5,927,473

[45] Date of Patent: Jul. 27, 1999

[54] PRODUCT CONVEYING DEVICE

[75] Inventor: Fiorenzo Draghetti, Medicina, Italy

[73] Assignee: G.D Societa' Per Azioni, Bologna, Italy

[21] Appl. No.: 08/848,121

[22] Filed: Apr. 28, 1997

[30] Foreign Application Priority Data

Apr. 30, 1996 [IT] Italy ................................ BO96A0227

[51] Int. Cl.$^{6}$ ...................................................... B65G 47/32

[52] U.S. Cl. ..................................... 198/474.1; 198/475.1

[58] Field of Search ............................. 198/470.1, 474.1, 198/475.1, 476.1, 478.1, 477.1

[56] References Cited

U.S. PATENT DOCUMENTS

| | | | |
|---|---|---|---|
| 2,408,599 | 6/1946 | Bennett . | |
| 3,659,694 | 5/1972 | Harris | 198/25 |
| 4,044,659 | 8/1977 | Bardenhagen et al. | 198/475.1 |
| 4,804,079 | 2/1989 | Hensgen et al. | 198/475.1 |
| 4,823,536 | 4/1989 | Manservigi et al. | 53/466 |
| 5,154,278 | 10/1992 | Deutsch | 198/475.1 |
| 5,267,577 | 12/1993 | Rizzoli et al. | 198/474.1 |

FOREIGN PATENT DOCUMENTS

| | | |
|---|---|---|
| 0608823 | 3/1994 | European Pat. Off. . |
| 2529179 | 12/1983 | France . |
| 4219631 | 12/1993 | Germany . |
| 2067150 | 7/1981 | United Kingdom . |

*Primary Examiner*—Janice L. Krizek
*Assistant Examiner*—Gregory A. Morse
*Attorney, Agent, or Firm*—Ladas & Parry

[57] ABSTRACT

A device for conveying products, in particular packets of cigarettes, whereby two wheels, rotating in opposite directions about respective axes parallel to each other, transfer from one to the other a succession of products at a transfer station; one of the wheels has a succession of fixed radial seats, and the other wheel has a succession of movable seats, each of which is fitted to the wheel so as to rotate about two axes parallel to the rotation axis of the wheel and so remain parallel to and facing a corresponding fixed seat during travel through the transfer station.

12 Claims, 3 Drawing Sheets

1
2
3
4
5
6
7
8
9
10
11
13
15
17
18
19
20
21
22
41
42
43
44

PRODUCT CONVEYING DEVICE

BACKGROUND OF THE INVENTION

The present invention relates to a product conveying device.

More specifically, the present invention relates to a product conveying device which is particularly suitable for use in the tobacco industry for transferring packets of cigarettes, to which the following description refers purely by way of example.

In the tobacco industry, conveying devices are used comprising two conveyor wheels in series with each other, and a transfer station interposed between the wheels; the wheels rotate in opposite directions about respective fixed axes parallel to each other to respectively supply and withdraw a succession of products to and from the transfer station; a first of the wheels comprises a succession of fixed radial seats; and a second of the wheels comprises a succession of seats movable in relation to the second wheel.

In known conveying devices of the type described above, each movable seat is normally so controlled as to mate with the corresponding fixed seat at the input of the transfer station, and to travel with the fixed seat along a common path throughout its passage through the transfer station.

The above operating mode requires the use of movable seats comprising relatively complex, high-cost members for connection to the conveyor wheel, and conveyor wheels of such complex design as to be relatively unreliable.

SUMMARY OF THE INVENTION

It is an object of the present invention to provide a conveying device for transferring a product between a movable and a fixed seat, but which is relatively straightforward in design, inexpensive and reliable.

According to the present invention, there is provided a device for conveying products, the device comprising two conveyor wheels in series with each other, and a transfer station interposed between the two wheels; the wheels rotating in opposite directions about respective fixed axes parallel to each other to respectively supply and withdraw a succession of said products to and from the transfer station; a first of said wheels comprising a succession of movable seats movable in relation to the first wheel; and a second of said wheels comprising a succession of fixed radial seats; the device being characterized in that each movable seat is connected in articulated manner to the first wheel to rotate, in relation to the first wheel, about two axes parallel to the rotation axis of the first wheel; actuating means being connected to each movable seat to rotate the movable seat about said two axes and so keep the movable seat parallel to and facing a corresponding fixed seat during travel through the transfer station.

BRIEF DESCRIPTION OF THE DRAWINGS

A number of non-limiting embodiments of the present invention will be described by way of example with reference to the accompanying drawings, in which.

DETAILED DESCRIPTION OF THE INVENTION

Figure 1:
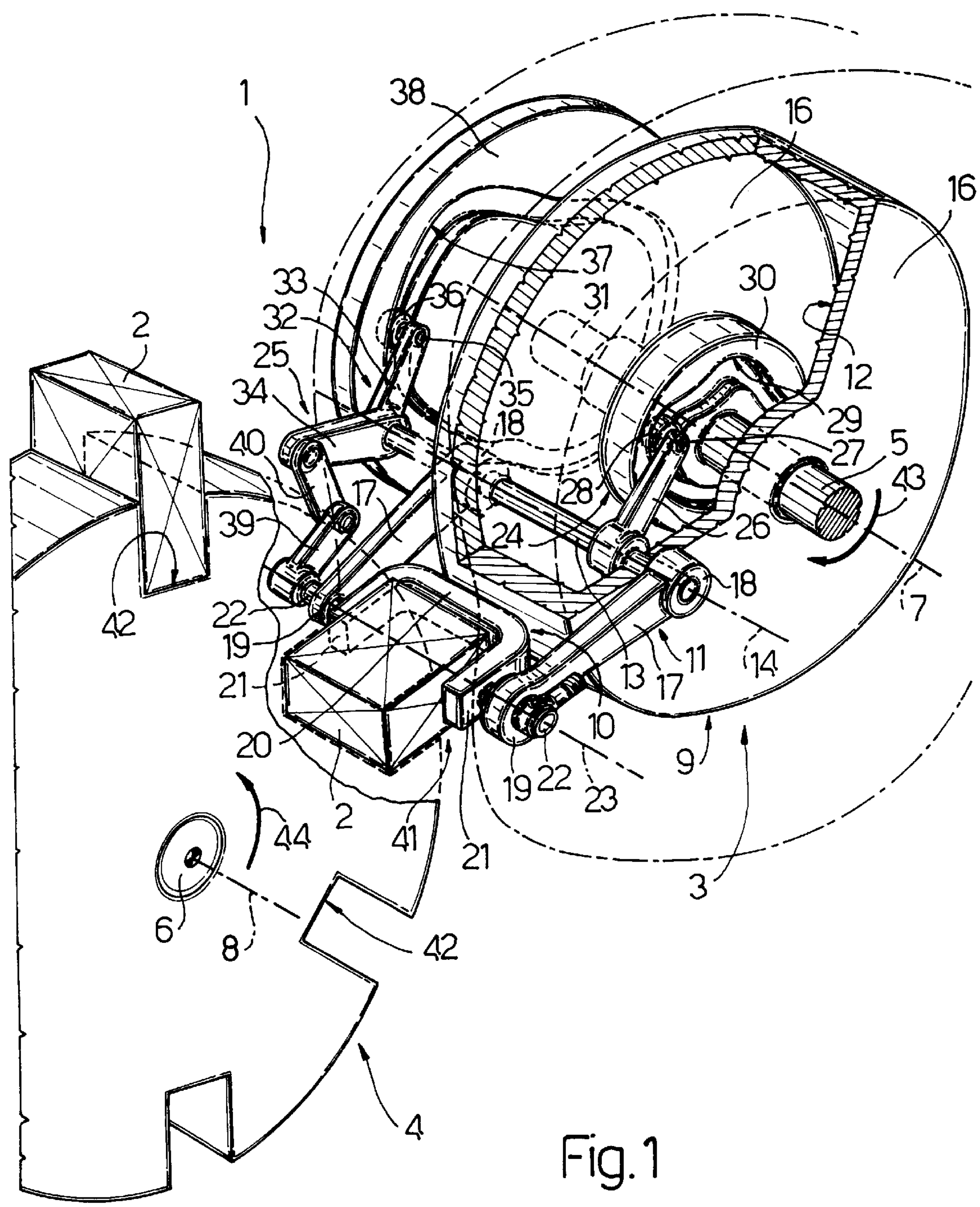
FIG. 1 shows a schematic view in perspective, with parts in section and parts removed for clarity, of a first preferred embodiment of the conveying device according to the present invention.

Number 1 in FIG. 1 indicates a device for conveying a succession of substantially parallelepiped products 2 comprising, in the example shown, packets or cartons of cigarettes.

Device 1 comprises a first wheel 3 and a second wheel 4, which are substantially coplanar, in series with and adjacent to each other, and which are fitted to respective shafts 5 and 6 coaxial with respective parallel axes 7 and 8. Shafts 5 and 6 are powered to rotate wheels 3 and 4 about respective axes 7 and 8 in opposite directions and at the same angular speed.

Wheel 3—hereinafter also referred to as the "input wheel"—comprises a drum 9 fitted to one end of shaft 5; and a number of pockets 10 defining respective seats 10*a* for respective products 2, and connected to drum 9 by respective supporting assemblies 11 extending radially from and equally spaced angularly about drum 9. Drum 9 comprises an inner cavity 12, and supports a number of through pins 13, each of which comprises an axis 14 parallel to axis 7, and rotates about axis 14 in relation to drum 9. Pins 13 are equally spaced about a circumference 15 coaxial with axis 7 (FIG. 2), and each pin 13 comprises an intermediate portion inside cavity 12, and two end portions projecting outwards of drum 9 from respective lateral walls 16 of drum 9.

With reference to FIG. 1, in addition to pin 13, each supporting assembly 11 also comprises two cranks 17, which are located facing each other on either side of drum 9, are perpendicular to axis 14, and each comprise two annular end portions 18 and 19, the first of which is fitted to a corresponding end portion of pin 13, and the second of which is hinged to respective pocket 10 located between the two cranks 17 of supporting assembly 11.

Each pocket 10 is substantially U-shaped, and comprises an end wall 20 parallel to axis 14; two lateral walls 21 perpendicular to wall 20 and facing annular end portions 19 of respective cranks 17; and two supporting pins 22, which extend from lateral walls 21 coaxially with a common axis 23 parallel to axis 14, and engage annular portions 19 of respective cranks 17 in rotary manner. More specifically, the height of walls 21 measured crosswise to wall 20 is such that the depth of pocket 10 is less than the thickness of product 2, which, when inserted inside pocket 10 contacting wall 20, consequently projects partly outwards of pocket 10.

Each supporting assembly 11 also comprises two orienting devices 24 and 25, the first of which rotates pin 13 and cranks 17 about respective axis 14, and the second of which rotates pocket 10 about axis 23.

Device 24 comprises an arm 26, which is integral with said intermediate portion of pin 13, extends radially outwards from pin 13, and is fitted on its free end with a pin 27 parallel to axis 14 and supporting for rotation a tappet roller 28 engaging an annular groove 29 of a face cam 30 housed inside cavity 12. Cam 30 is fitted to one end of a fixed shaft 31, which is coaxial with axis 7, is located on the opposite side of drum 9 to shaft 5, and comprises an end portion extending inside cavity 12 through a hole formed through the lateral wall 16 of drum 9 opposite the one fitted to shaft 5.

Device 25 comprises a substantially L-shaped rocker arm 32 hinged to the end portion of pin 13 facing shaft 31 so as to oscillate about axis 14, and having two arms 33 and 34 perpendicular to axis 14. Device 25 also comprises a pin 35 extending parallel to axis 14 from one end of arm 33; a tappet roller 36 fitted in rotary manner to pin 35 and engaging an annular groove 37 formed on a cam 38 perpendicular to axis 7 and extending about axis 7; a crank 39 perpendicular to axis 23 and fitted at one end to one of pins 22; and a connecting rod 40 having two opposite ends hinged to arm 34 and crank 39.

Figure 2:
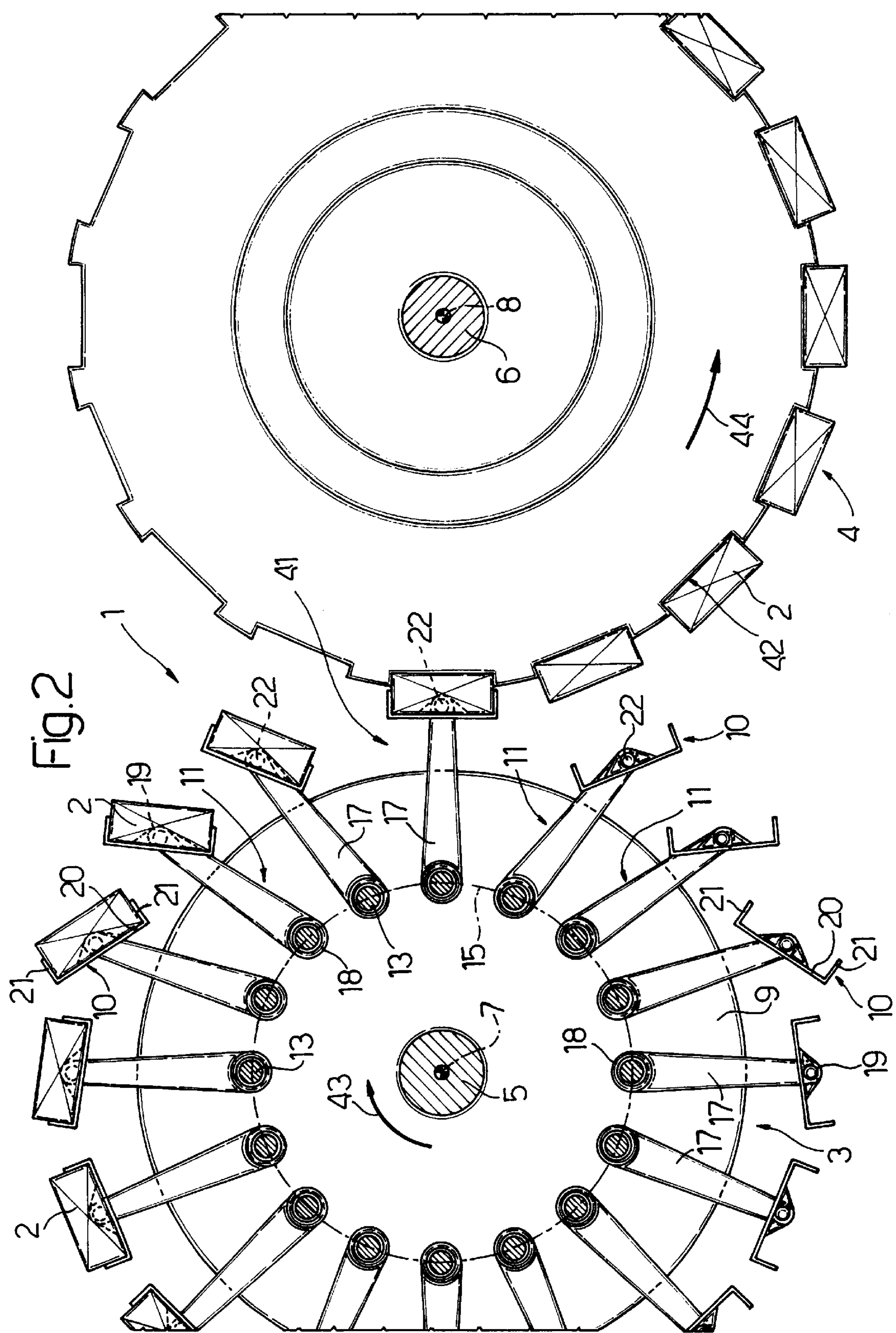
FIG. 2 shows a side view, with parts removed for clarity, of a variation of the FIG. 1 device.

In the FIG. 1 embodiment, pockets 10 receive respective products 2 with their longer longitudinal axis perpendicular to end walls 20 of pockets 10; whereas, in the FIG. 2 variation, pockets 10 receive respective products 2 with their longer longitudinal axis parallel to end walls 20 of pockets 10.

In both the above embodiments, and with reference in particular to FIG. 2, pockets 10 feed products 2 from a loading station (not shown) to a transfer station 41 where products 2 are transferred from wheel 3 to wheel 4; and each pocket 10 preferably comprises a known retaining device (not shown) for releasably retaining product 2 inside as pocket 10 travels from the loading station to transfer station 41 where the distance between wheels 3 and 4 is minimum.

Wheel 4—hereinafter also referred to as the "output wheel"—is of known type, and comprises a number of fixed seats 42 equally spaced about the periphery of wheel 4 and for receiving products 2 from pockets 10 on wheel 3 at station 41, retaining products 2 by means of known mechanical devices (not shown), and transferring products 2 to an unloading station (not shown). For which purpose, and as explained more clearly later on, the depth of each seat 42 is less than the thickness of a product 2 and complementary to the depth of the corresponding pocket 10.

Operation of device 1 will now be described with reference to one pocket 10 on wheel 3 and a corresponding seat 42 on wheel 4.

With reference to FIG. 2, in actual use, a product 2 is fed into respective pocket 10 by any known supply means (not shown) as pocket 10 travels through said loading station (not shown). Once inserted inside pocket 10, product 2 is retained contacting wall 20 and is fed by wheel 3 in a direction 43 towards transfer station 41. At the same time, the seat 42 corresponding to the pocket 10 in question is fed in a direction 44 from said unloading station (not shown) towards transfer station 41, and is fed through station 41 in time with corresponding pocket 10.

Groove 37 is so formed as to rotate pocket 10 gradually about respective axis 23 as pocket 10 nears transfer station 41, so that, at the input of station 41, wall 20 of pocket 10 is positioned parallel to the bottom of corresponding seat 42, and is kept in this position by groove 37 throughout its travel through station 41.

Groove 29 is so formed that, as pocket 10 nears station 41, cranks 17 are gradually rotated about axis 14 in the opposite direction to the rotation direction of wheel 3 (clockwise in FIG. 2) so that, at the input of station 41, pocket 10 is positioned facing corresponding seat 42. As a result of this rotation of cranks 17, axis 23 of pins 22 is located upstream, in direction 43, with respect to a plane P defined by axes 7 and 14; and, as they travel through station 41, cranks 17 are rotated by groove 29 about axis 14 in the same direction as wheel 3 to keep pocket 10 facing corresponding seat 42. As a result of this further rotation, axis 23 of pocket 10 is positioned, at the output of station 41, downstream with respect to plane P, which represents the mid plane of cranks 17 when pocket 10 is well clear of station 41.

As pocket 10 and corresponding seat 42 travel through station 41, the portion of product 2 projecting from pocket 10 is gradually inserted inside seat 42; and, upon said portion of product 2 occupying the whole of seat 42, product 2 is released by the retaining device (not shown) of pocket 10, and is retained by the retaining device (not shown) of seat 42 up to said unloading station (not shown) where product 2 is unloaded off output wheel 4.

As it is being transferred, product 2 may be subjected to one or more operations, such as the formation about product 2 of a U-shaped wrapping formed by inserting product 2 into respective seat 42 together with a sheet (not shown) of wrapping material.

In other words, device 1 provides for transferring product 2 from wheel 3 to wheel 4 by simply orienting each pocket 10 about respective axes 14 and 23 so that, throughout its travel through station 41, pocket 10 is constantly maintained parallel to and facing corresponding seat 42, and by so arranging axes 7 and 8 that, when cranks 17 swing about axis 14 into plane P inside station 41, the distance between wall 20 and the bottom surface of corresponding seat 42 substantially equals the thickness of product 2 measured along plane P and perpendicular to axis 7.

Figure 3:
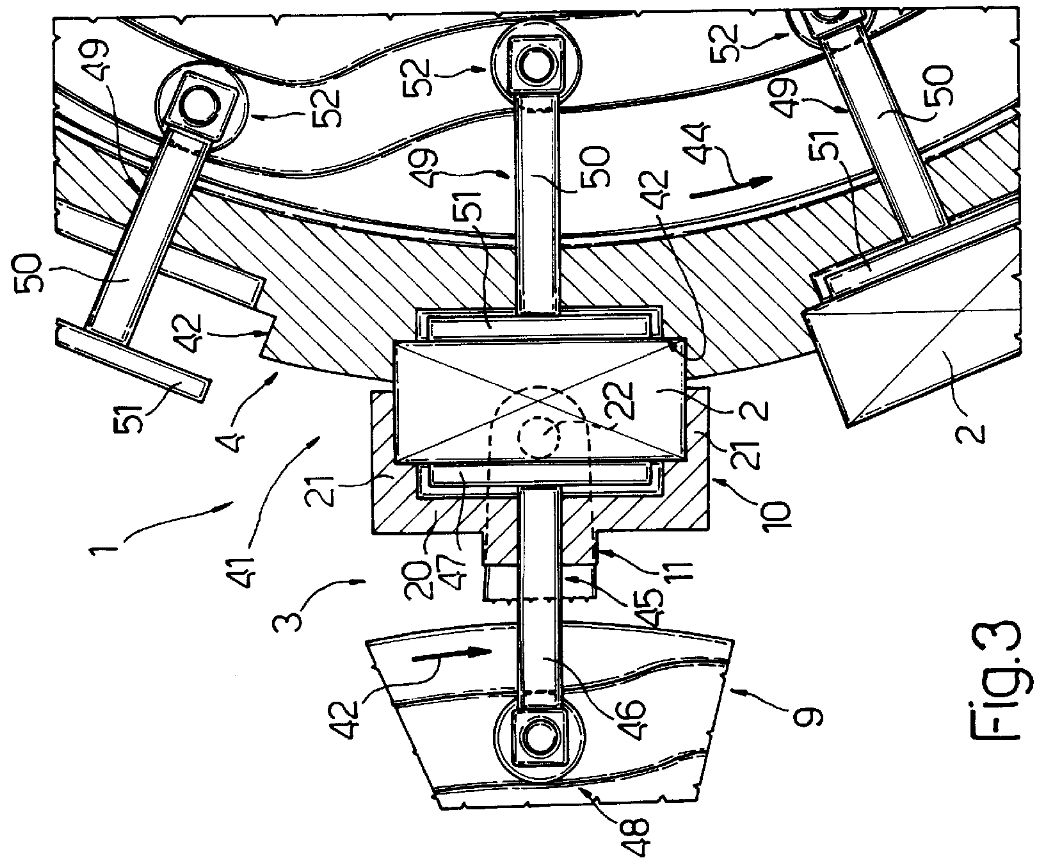
FIG. 3 shows a larger-scale schematic section of a first variation of a detail of the FIG. 2 device.

In the FIG. 3 variation, each pocket 10 comprises a respective pusher 45, which in turn comprises a rod 46 perpendicular to and movable axially through end wall 20 of pocket 10, and a plate 47 perpendicular to rod 46 and integral with one end of rod 46 inside pocket 10. Each pusher 45 also comprises a cam actuating device 48 for moving rod 46 axially between a withdrawn position in which plate 47 contacts wall 20, and an extracted position in which plate 47 projects outwards of pocket 10.

In this variation, each seat 42 on wheel 4 comprises a respective pusher 49, which in turn comprises an axially-movable rod 50 extending radially through the bottom of seat 42, and a plate 51 perpendicular to rod 50 and integral with one end of rod 50 inside seat 42. Each pusher 49 also comprises a cam actuating device 52 for moving rod 50 axially between a withdrawn position in which plate 51 contacts the bottom of seat 42, and an extracted position in which plate 51 projects outwards of seat 42. At station 41, pushers 45 and 49 operate in push-pull manner to transfer a product 2 from pocket 10 to seat 42.

Figure 4:
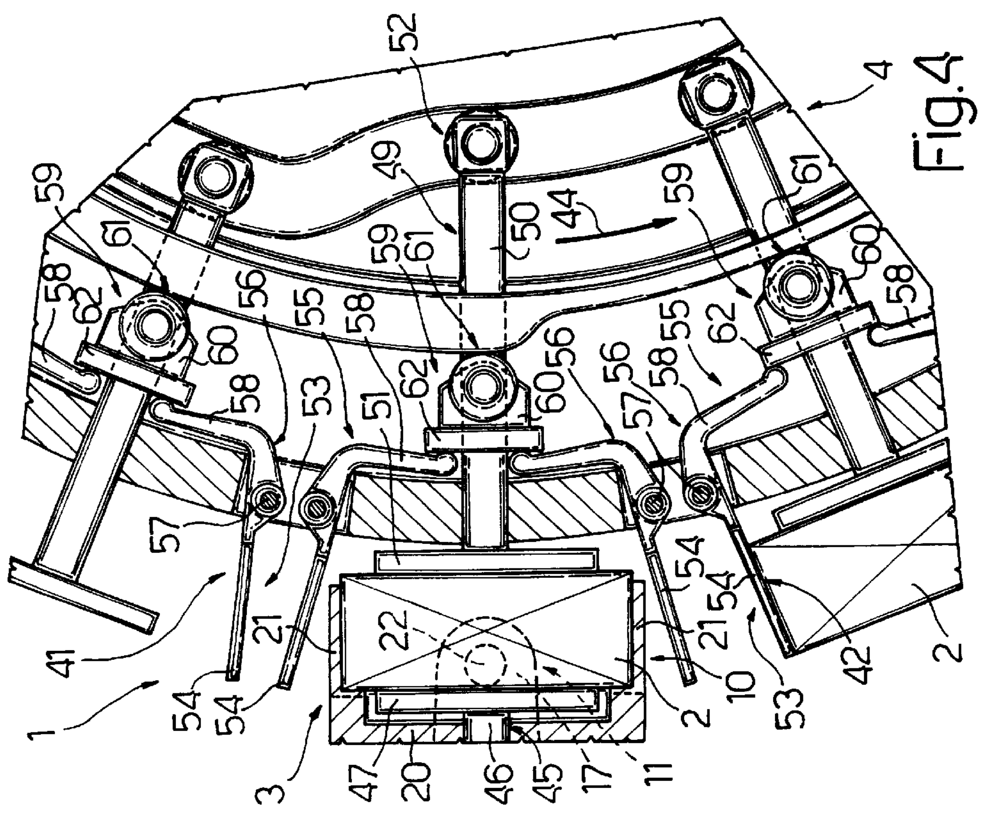
FIG. 4 shows a larger-scale schematic section of a second variation of a detail of the FIG. 2 device.

In the FIG. 4 variation, wheel 3 comprises pockets 10 similar to those of the FIG. 3 variation, and of a depth equal to the thickness of products 2 so as to house products 2 entirely. In this case, seats 42 described previously are defined by respective pockets 53, each of which comprises a bottom plate defined by plate 51 of pusher 49 in the FIG. 3 variation, and two lateral walls 54 movable between an open position in which walls 54 are so positioned as to enable respective pocket 10 to be inserted into contact with plate 51, and a closed position in which walls 54 are positioned perpendicular to plate 51 to grip respective product 2.

For this purpose, walls 54 define the jaws of a gripping device 55, and each form one arm of a respective substantially L-shaped rocker arm 56 hinged centrally to wheel 4 to rotate, in relation to plate 51, about a respective axis 57 parallel to axis 8. Each rocker arm 56 also comprises a further arm 58 extending towards the rod of pusher 49 inside wheel 4.

Gripping device 55 comprises an actuating device 59, which in turn comprises a slide 60 moved along rod 50 of pusher 49 by a cam device 61, and a plate 62 located on slide 60, crosswise to rod 50, and forming a support for the ends of the two arms 58, which are held contacting plate 62 by springs (not shown) fitted at the pivots of rocker arms 56.

Gripping device 55 permits a wrapping operation to be performed on product 2. That is, a sheet (not shown) of wrapping material may be fed to transfer station 41 in time with a respective pair of pockets 10 and 53 and a respective product 2 housed inside respective pocket 10, so that the sheet is inserted inside pocket 53 in the open position as respective pocket 10 penetrates pocket 53, and is folded into a U about respective product 2 as product 2 is released inside pocket 53 and walls 54 are moved into the closed position.

I claim:

1. A device for conveying products (2), the device comprising two conveyor wheels (3, 4) in series with each other, and a transfer station (41) interposed between the two wheels (3, 4); the wheels (3, 4) rotating in opposite directions about respective fixed axes (7, 8) parallel to each other to respectively supply and withdraw a succession of said products (2) to and from the transfer station (41); a first (3) of said wheels (3, 4) comprising a succession of movable seats **(10*a*) movable in relation to the first wheel (3); and a second (4) of said wheels (3, 4) comprising a succession of fixed radial seats (42); wherein each movable seat (10*a*) is connected in articulated manner to the first wheel (3) to rotate, in relation to the first wheel (3), about two axes (14, 23) parallel to the rotation axis (7) of the first wheel (3); actuating means (11) being connected to each movable seat (10*a*) to rotate the movable seat (10*a*) about said two axes (14, 23) and so keep the movable seat (10*a*) parallel to and facing a corresponding fixed seat (42) during travel through the transfer station (41) and push means (45, 49) mounted through a bottom surface of each said seat (10*a*; 42) so as to move through the seat (10*a*; 42)** in a direction generally perpendicular to said bottom surface.

2. A device as claimed in claim 1, wherein said actuating means (11) comprises, for each said movable seat **(10*a*), crank means (17) hinged to the first wheel (3) to rotate, in relation to the first wheel (3), about a respective first (14) of said two axes (14, 23)**.

3. A device as claimed in claim 2, wherein the first axes (14) of said movable seats **(10*a*) are located along a circumference (15) coaxial with the fixed rotation axis (7) of the first wheel (3)**.

4. A device as claimed in claim 2 comprising, for each said movable seat **(10*a*), a movable pocket (10) defining the movable seat (10*a*) itself; said actuating means (11) connecting the movable pocket (10) to the first wheel (3) and comprising first and second orienting devices (24, 25); the respective said crank means (17) being hinged to the movable pocket (10) to rotate, in relation to the movable pocket (10), about a second (23) of said two axes (14, 23); and said first and second orienting devices (24, 25) controlling the angular position of said crank means (17) about the first (14) and second (23)** axis respectively.

5. A device as claimed in claim 4, wherein each said movable pocket (10) is cup-shaped to house the whole of a respective said product (2); each said fixed seat (42) being defined by a cup-shaped fixed pocket (53) having lateral walls (54) movable between an open position permitting insertion of the movable pocket (10) inside the fixed pocket (53), and a closed position defining the respective said fixed seat (42).

6. A device as claimed in claim 1, wherein said two axes (14, 23) parallel to the rotation axis (7) of said first wheel (3) are movable.

7. A device for conveying products (2), the device comprising two conveyor wheels (3, 4) in series with each other, and a transfer station (41) interposed between the two wheels (3, 4); the wheels (3, 4) rotating in opposite directions about respective fixed axes (7, 8) parallel to each other to respectively supply and withdraw a succession of said products (2) to and from the transfer station (41); a first (3) of said wheels (3, 4) comprising a succession of movable seats **(10*a*) movable in relation to the first wheel (3); and a second (4) of said wheels (3, 4) comprising a succession of fixed radial seats (42); each movable seat (10*a*) being connected in articulated manner to the first wheel (3) to rotate, in relation to the first wheel (3), about two axes (14, 23) parallel to the rotation axis (7) of the first wheel (3); actuating means (1) connected to each movable seat (10*a*) to rotate the movable seat (10*a*) about said two axes (41, 23) and so keep the movable seat (10*a*) parallel to and facing a corresponding fixed seat (42) during travel through the transfer station (41); and a movable pocket (10) defining each movable seat (10*a*) itself; each said movable pocket (10) being cup-shaped to house all of a respective said product (2); each said fixed seat (42) being defined by a cup-shaped fixed pocket (53) having lateral walls (54) movable between an open position permitting insertion of the movable pocket (10) inside the fixed pocket (53), and a closed position defining the respective said fixed seat (42)**.

8. A device as claimed in claim 7, wherein said actuating means (11) comprises, for each said movable seat **(10*a*), crank means (17) hinged to the first wheel (3) to rotate, in relation to the first wheel (3), about a respective first (14) of said two axes (14, 23)**.

9. A device as claimed in claim 8, wherein the first axes (14) of said movable seats **(10*a*) are located along a circumference (15) coaxial with the fixed rotation axis (7) of the first wheel (3)**.

10. A device as claimed in claim 8, comprising for each said movable seat **(10*a*), a movable pocket (10) defining the movable seat (10*a*) itself; said actuating means (11) connecting the movable pocket (10) to the first wheel (3) and comprising first and second orienting devices (24, 25); the respective crank means (17) being hinged to the movable pocket (10) to rotate, in relation to the movable pocket (10), about a second (23) of said two axes (14, 23); and said first and second orienting devices (24, 25) controlling the angular position of said crank means 917) about the first (14) and second (23)** axis respectively.

11. A device as claimed in claim 7, comprising push means (45, 49) mounted through a bottom surface of each said seat **(10*a*, 42) so as to move through the seat (10*a*, 42)** in a direction generally perpendicular to said bottom surface.

12. A device as claimed in claim 7, wherein said two axes (14, 23) parallel to the rotation axis (7) of said first wheel (3) are movable.

* * * * *